April 23, 1940.　　　　F. B. HEWEL　　　　2,198,478
TIRE CHAIN
Filed Dec. 5, 1936
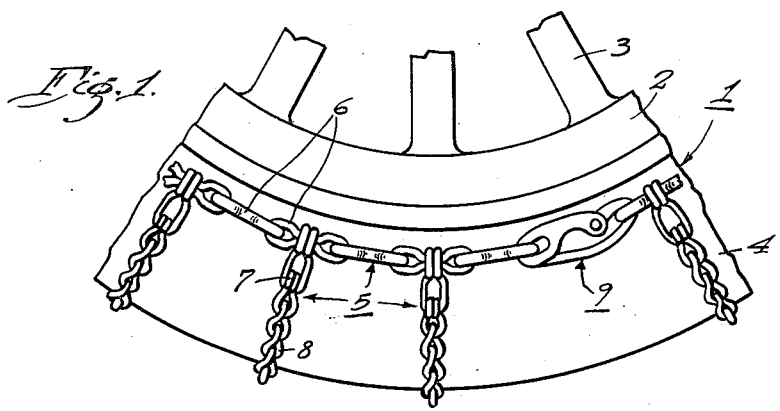
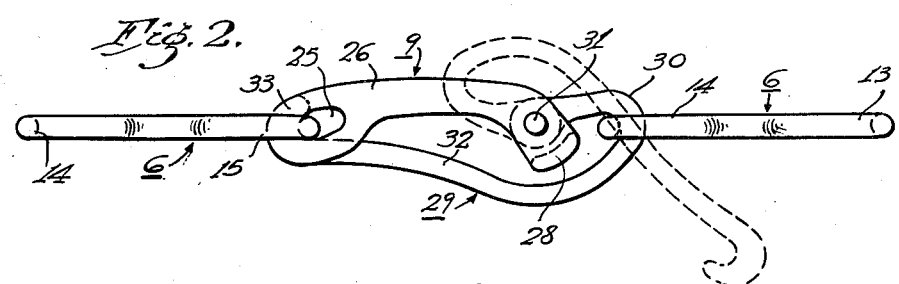
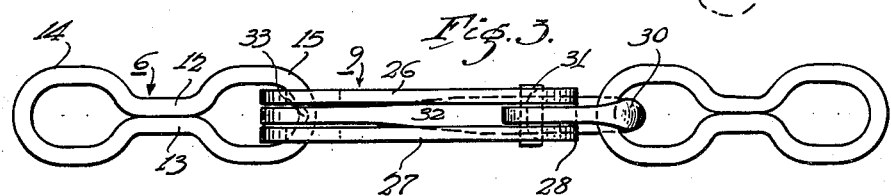
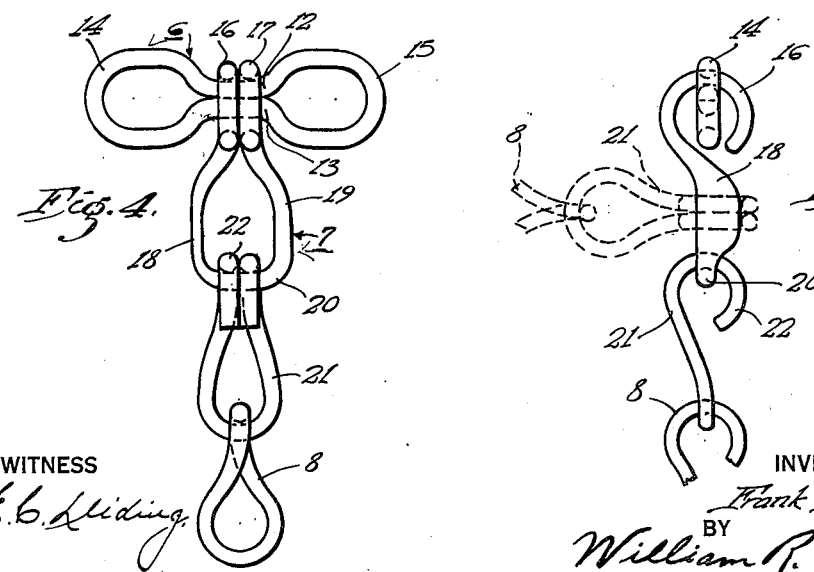
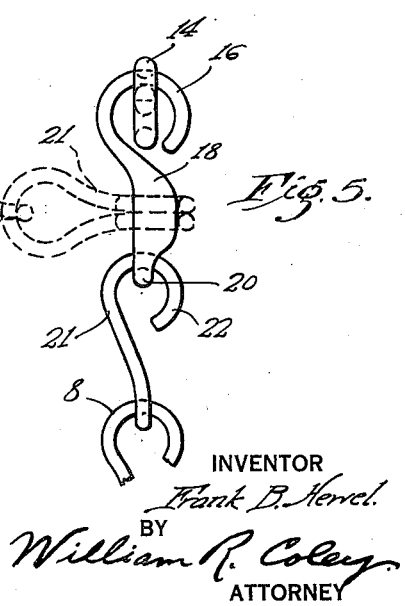
WITNESS
INVENTOR
Frank B. Hewel.
BY William R. Coley
ATTORNEY Patented Apr. 23, 1940

2,198,478

UNITED STATES PATENT OFFICE 2,198,478

TIRE CHAIN

Frank B. Hewel, Pittsburgh, Pa.

Application December 5, 1936, Serial No. 114,389

7 Claims. (Cl. 152—241)

My invention relates to tire chains and particularly to the attachment of cross chains and the fastening of side chains therefor.

One object of my invention is to provide a side link preferably with substantially parallel central portions and a cross chain connector permanently secured around these portions, whereby relatively short cross chains may be employed for replacement purposes, thus reducing the expense thereof.

Another object of my invention is to provide a side link of the character set forth whereby only a small lateral shift of the cross chain connector is permitted, thus maintaining the initial spacing of the cross chains, which may be connected to any desired link and, in addition, the wear on the side link is distributed over both sides thereof.

A further object of my invention is to provide a cross chain connector permanently secured to a side chain link and having a portion for permitting attachment of a cross chain without tools.

A more specific object of my invention is to provide a return-bent cross chain connector permanently secured to a side link and having a relatively thin section for permitting attachment of a cross chain without tools, another portion of the connector normally engaging the cross chain in use.

Another object of my invention is to provide as an article of manufacture a cross chain connector having a side chain connecting portion and another portion for permitting attachment of a cross chain without tools.

A further object of my invention is to provide a side chain fastener having a return-bent portion for attachment to a side chain link, the fastener having a hook at one end so disposed as to engage a second link and prevent the fastener pulling apart under tension conditions on the side chain.

Other objects of my invention will become evident from the following detailed description taken in conjunction with the accompanying drawing, wherein:

Figure 1 is a fragmentary view in side elevation of an automobile wheel structure to which my present invention is applied;

Fig. 2 and Fig. 3 are respectively side and plan views of my side chain fastener attached to my side chain links; and Fig. 4 and Fig. 5 are respectively side and end views of my cross chain connector and its associated side chain and cross chain links.

Referring to Fig. 1, the automobile wheel structure 1 is shown as comprising a rim 2, spokes 3, and a tire 4, to which tire my novel tire chain 5 is attached, this tire chain comprising side chain links 6, and cross chain connectors 7 permanently attached thereto for receiving the ends of cross chains 8, a novel side chain fastener 9 being provided for holding the ends of the side chain in proper position.

Each side chain link preferably comprises two central, closely assembled, straight portions 12 and 13 terminating in elongated eyes or end loops 14 and 15. The adjacent eyes interlace with each other, thus providing a side chain shown in Fig. 1, to any link of which a cross chain may be applied, since my side chain maintains its alinement on the tire and there is no tendency to twist the cross chain out of position.

My cross chain connector 7 (see Figs. 4 and 5) is shown as being return-bent in character, the end portions 16 and 17 being permanently looped around the central portions 12 and 13 of the adjacent side chain link 6. The cross connector 7 comprises one side portion 18 which is relatively thin in the direction of the side chain link and an opposite side portion 19 of normal diameter, a central connecting portion 20 being provided to complete the preferably integral cross chain connector, the portion 20 having rounded-corner connections with the side portions 18 and 19.

In this way, my side chain as prepared for sale would comprise a plurality of links 6 with preferably my improved fastener 9 at one end thereof, the construction of this fastener being subsequently described, and a plurality of cross chain connectors 7 permanently secured around the central portions of selected side chain links, which, as shown in the drawing, constitute every other link, although any other desired spacing of cross chains may be employed, such as on every link of the side chain.

Consequently, in initially purchasing cross chain links or in replacing the same, it is necessary merely to purchase a relatively short cross chain having the usual detachable end links 21 with open end hooks 22 and a series of the familiar twisted links 8. It will be appreciated that, since the end cross chain links 21, instead of having to extend to the side chain links 6, merely have to extend to the intermediate portion 20 of the cross chain connectors 7 on each side of the tire, they may be relatively short, and thus replacements thereof are relatively less expensive. Since there is normally no wear on the cross chain connectors 7 any more than there is on the side chain links 6, there will be normally no necessity for replacing these cross chain connectors, and the benefit of savings on these shorter cross chains that are made possible through the use of my invention will last throughout the life of the side chain.

The method of attachment and detachment of the cross chain connector 7 is relatively simple and does not require any tools. Taking the solid line position of the cross chain connector 7 and the end cross chain link 21 shown in Fig. 5, it is merely necessary, as indicated by the dotted figure, to turn the end link 21 at right angles and in contact with the flattened side member 18 of cross connector 7, which will permit the cross chain and link 21 to be slipped off through the usual opening that is provided at the ends 22 of the link. To replace a new cross chain, it is merely necessary to reverse this procedure by slipping the end cross chain link 21 over the flattened side portion 18 of cross connector 7 and then sliding the cross chain end link hooks 22 around to their normal position on the full diameter central portion 20, as shown in solid lines in Figs. 4 and 5.

It will be noted that, by reason of the cross chain connector loops or eyes 16 and 17 extending around both central portions 12 and 13 of the side chain links, wear will be distributed on both of these chain link portions 12 and 13 rather than on one portion only as is usual. Furthermore, by choosing the length of the central portions 12 and 13 in conjunction with the elongated eyes 14 and 15, the amount of lateral shift permitted to the cross chain connectors 7 is correspondingly limited, and thus the initial peripheral spacing of the cross chains may be maintained within relatively narrow limits. Moreover, the elongated opening in loops 14 and 15 readily permits coupling of fastener 9 in any desired link, as in the case where the side chain is too long and it is necessary to drop a link, thus requiring the fastener to be secured to the next link.

My side chain fastener 9, shown in enlarged form in Figs. 2 and 3, comprises a duplex body portion having side members 26 and 27 which are joined by an intermediate end portion 28, so that this portion of the connector is of return-bent structure. The free ends of side members 26 and 27 are provided with a slot 25 through which eye 15 of the adjacent side chain link 6 passes. A single element 29 has a central, slightly-curved portion 32 emerging into a rounded or bent portion 30 threaded through adjacent eye 14 of side link 6, the end of portion 30 being pivoted at 31 between the side members 26 and 27 near the central portion or closed end 28, while the other end of member 29 terminates in a hook 33 which fastens into the eye 15 of the adjacent side chain link 6.

The closed position of my side chain connector 9 is shown in solid lines in Figs. 2 and 3, while the open position is shown in dotted lines in Fig. 2. It will be noted that in the closed position the side chain links 6 on each end of the connector are in substantial alinement, so that there is no tendency to twist the fastener open. However, if it should accidentally come open, the pull of the side chain links on my flat fastener 9 is still in such a direction (in alinement with the side chain), in view of the bend 30 in member 29, as to prevent the side chain link from becoming disconnected or even causing a lengthening of the side chain as a whole.

On the other hand, when it is desired to disconnect the side chain, the hook 33 may be readily disconnected by pushing the adjacent side chain link 6 farther into the slot 25, or hook 33 farther into loop 15, and upon the member 29 occupying the position shown in dotted lines, the other illustrated side chain link 6 may be readily disconnected.

To fasten the side chain link ends together, the reverse procedure is followed, member 29 in its open or dotted line position being passed through the eye 14 of the adjacent side chain link 6, and the member 29 is then moved into its illustrated solid line position, maintaining the tension on the side chain by reason of the configuration of member 29, including particularly the rounded bend 30, after which the hook 33 is slipped into its illustrated final position. Bend 30 and elongated loop 14 together allow member 29 to readily snap over into its solid line position.

It will be seen that I have thus provided a relatively simple but effective tire chain which will reduce the expense of replacing worn out cross chains and at the same time reduces the wear and liability of breakage of the side chain and provides a relatively simple, effective and quickly operated connector for the side chain itself.

I do not wish to be restricted to the specific structural details or arrangement of parts herein set forth, as various modifications thereof may be effected without departing from the spirit and scope of my invention. I desire, therefore, that only such limitations shall be imposed thereon as are indicated in the appended claims.

I claim as my invention:

1. A tire chain having a plurality of side links each having substantially parallel central portions and outer eye portions for engaging adjacent side links and a plurality of cross-chain connectors each having a portion permanently secured around said central portions, said permanently secured portions being comparable in total width to the length of said central portions thereby to maintain within narrow limits the initial spacing of said cross-chain connectors.

2. A tire chain having a side link and a cross chain connector having one portion permanently secured to said link, another portion having a relatively thin section, and another portion of said connector normally being securely engaged by the cross chain, whereby said cross chain may be readily detached from said connector at said thin section without disturbing said side link.

3. A tire chain having a side link with central portions extending substantially parallel to and in contact with each other to avoid distortion under load and a cross-chain connector having a portion permanently secured around said central portions, and having another portion of a relatively thin section, and another portion of said connector normally being securely engaged by the cross chain, whereby said cross chain may be readily detached from said connector at said thin section.

4. A tire chain having a side link having substantially parallel relatively close intermediate portions, and a return-bent cross-chain connector having its two ends permanently secured around said intermediate portions and having a side section relatively thin in the direction of the side chain, the central portion of said connector opposite said ends normally being securely engaged by the cross chain, whereby said cross chain may be readily detached from said connector at said thin section.

5. A tire chain having a side link with central portions extending substantially parallel to and in contact with each other to avoid distortion under load and a return-bent cross-chain connector having its two ends permanently secured around said central portions and having a side section relatively thin in the direction of the side chain, the central portion of said connector opposite said ends normally being securely engaged by the cross chain, whereby said cross chain may be readily detached from said connector at said thin section.

6. A tire chain having a plurality of substantially identical side links attached in series, a cross-chain, and an intermediate link for interconnecting any one of said side links to said cross-chain, said intermediate link having a portion permanently connected around said one side link, an intermediate portion having a relatively thin section, and a third portion securely engaged by said cross-chain whereby said cross-chain may be readily detached from said intermediate link by swinging the cross-chain to a point opposite said thin section without disturbing said side links or the attachment of said intermediate link thereto.

7. A tire chain having a plurality of substantially identical side links attached in series, each side link having substantially parallel relatively close intermediate portions, a cross-chain, and an intermediate link for interconnecting any one of said side links to said cross-chain, said intermediate link having one end portion permanently connected around said intermediate portions, a middle portion having a relatively thin section, and another end portion securely engaged by said cross-chain, whereby said cross-chain may be readily detached from said intermediate link by swinging the cross-chain to a point opposite said thin section without disturbing said side links or the attachment of said intermediate link thereto.

FRANK B. HEWEL.